United States Patent
Chen

(10) Patent No.: US 9,400,534 B2
(45) Date of Patent: Jul. 26, 2016

(54) ELECTRONIC DEVICE WITH ADJUSTABLE CURRENT SUPPLY CONNECTORS

(75) Inventor: Feng-Lin Chen, New Taipei (TW)

(73) Assignee: Qisda Corporation, Taoyuan County (TW)

( * ) Notice: Subject to any disclaimer, the term of this patent is extended or adjusted under 35 U.S.C. 154(b) by 1015 days.

(21) Appl. No.: 13/568,237

(22) Filed: Aug. 7, 2012

(65) Prior Publication Data
US 2013/0038990 A1 Feb. 14, 2013

(30) Foreign Application Priority Data
Aug. 13, 2011 (CN) .......................... 2011 1 0233154

(51) Int. Cl.
 H01H 83/00 (2006.01)
 G06F 1/26 (2006.01)
 G06F 1/18 (2006.01)
(52) U.S. Cl.
 CPC ... G06F 1/26 (2013.01); G06F 1/18 (2013.01)
(58) Field of Classification Search
 CPC .................................. G06G 1/26; G06G 1/18
 USPC ...................... 307/31–32, 116, 125
 See application file for complete search history.

(56) References Cited

U.S. PATENT DOCUMENTS

| | | | | |
|---|---|---|---|---|
| 5,570,002 A * | 10/1996 | Castleman | .............. | G05F 1/577 307/31 |
| 6,014,013 A * | 1/2000 | Suppanz | ............... | H02J 7/0016 320/120 |
| 6,046,513 A * | 4/2000 | Jouper et al. | ..................... | 307/31 |
| 6,137,280 A * | 10/2000 | Ackermann | .......... | H02J 7/0008 323/224 |
| 6,459,175 B1 * | 10/2002 | Potega | .................. | B60L 11/185 307/132 M |
| 7,436,687 B2 * | 10/2008 | Patel | .................. | H01R 13/6675 363/142 |
| 2010/0052622 A1* | 3/2010 | Chen et al. | ..................... | 320/148 |
| 2011/0006603 A1* | 1/2011 | Robinson et al. | ............... | 307/31 |

* cited by examiner

*Primary Examiner* — Jared Fureman
*Assistant Examiner* — Alfonso Perez Borroto

(57) ABSTRACT

The invention provides an electronic device with connectors which can be adjusted the providing current. The connectors connect external electronic devices and provide current to power the external electronic devices. User can adjust the current providing status through the user interface of the electronic device according to high or low current requirement of external electronic devices. The electronic device can also read out the power parameter storing in an external electronic device, and adjust the current according to the power parameter.

14 Claims, 2 Drawing Sheets

| Power Information | |
|---|---|
| System | 40.00 Watt (Max:65.00 Watt) |
| Connectors | 1.5 Watt (Max:7.5 Watt) |
| Connector Status | | | |

| First connector | Second connector | Third connector |
|---|---|---|
| Standby | Standby | Standby |
| 500 mA | 500 mA | 500 mA |

| Power Information | |
|---|---|
| System | 40.00 Watt (Max:65.00 Watt) |
| Connectors | 4.5 Watt (Max:7.5 Watt) |
| Connector Status | | | |

| First connector | Second connector | Third connector |
|---|---|---|
| Standby | Not Available | Standby |
| 1000 mA | 0 mA | 500 mA |

ELECTRONIC DEVICE WITH ADJUSTABLE CURRENT SUPPLY CONNECTORS

This application claims the benefit of People's Republic of China Application Serial No. 201110233154.1, filed Aug. 13, 2011, the subject matter of which is incorporated herein by reference.

BACKGROUND OF THE INVENTION

1. Field of the Invention

The invention relates to an electronic device with connectors which can be adjusted the providing current. The connectors connect external electronic devices and provide current to power the external electronic devices. User can adjust the current providing status through the user interface of the electronic device according to high or low current requirement of external electronic devices. The electronic device can also read out the power parameter storing in an external electronic device, and adjust the current according to the power parameter.

2. Description of the Prior Art

The electronic devices are generally installed with standard connectors, i.e. USB, HDMI, SATA, for easily connecting different peripheral electronic devices with standard connectors. Normally, each of standard connectors can only provided a fixed voltage and a rated current. For example, when connecting to a USB 2.0 connector, the USB 2.0 connector can provide 5V/500 mA equal to 2.5 W total power to a peripheral electronic device. The USB 3.0 connector can provide 5V/900 mA equal to 4.5 W total power to a peripheral electronic device. There is an upper current limit of the connector for protecting the electronic device. If the current of the connector was higher than the upper limit, an overload protective circuit of the electronic device will be active to stop providing any current to the peripheral electronic devices through the connector.

To overcome the mentioned problem, user may use a "Y" type connecting wire for providing more current to the peripheral electronic device. There are two connectors of the first end of the "Y" type connecting wire connecting two standard connectors of the electronic device. The second end of the "Y" type connecting wire connects the peripheral electronic device for providing double volume of current from both of the standard connectors. Although the additional "Y" type connecting wire can overcome the mentioned problem, it's still not convenient for user to carry the additional "Y" type connecting wire.

SUMMARY OF THE INVENTION

It is therefore an object of the invention for an electronic device connecting an external electronic device to selectively provide extra current to the connector of the external electronic device. The electronic device has a first connector, a second connector, a third connector, a first switching unit, a second switching unit, a control unit, a power supply unit, a user interface, a display unit, a detecting unit and other power consuming units. Normally, when one of the first connector, the second connector and the third connector connects the connector of the electronic device, the electronic device respectively provides a first current, a second current and a third current to the connector. The first switch unit couples the first connector and the second connector. The second switch unit couples the first connector and the third connector. When the connector of the external electronic device connects the first connector, the control unit controls the first switch selectively guiding the second current to the connector according the requirement of the external electronic device. If the second current is provided to the first connector, i.e. the external electronic needs more current than the first current, the second connector stops providing any current. If the requirement needs a higher current for the external electronic device, the control unit makes the second switch unit guide the third current to the first connector and the third connector stops providing any current. The first connector, the second connector and third connector are regulated with a rated voltage and current.

The user interface can be a keyboard, a mouse or a touch display panel for operating the control unit. The control unit controls the first switch unit and the second control unit for guiding the second current or the third current to the first connector.

The display unit can display power information including: quantities of current providing to all connectors and the total current of the power supply unit. The types of charts can be a bar chart, a list chart or a pie chart. The power consuming units, for example, backlight units, speaker or other units can be normally operating with a first power or a second power. The first power is higher than the second power. The power consuming units normally operate with the first power and the total power is below a preset threshold. When the total power is higher than the preset threshold, the power consuming units switch the first power to the second power and display a warning message on the display unit.

The external electronic device has a first circuit and a second circuit, the first circuit storing a power parameter. When the connector of the external electronic device connects the first connector, the first current is provided to the first circuit. The detecting unit detects the power parameter storing in the first circuit. When the power parameter is higher than a preset threshold, it means the first current is not enough to power the second circuit, the control unit makes the first switch unit guiding the second current to the first connector. As the current provides to the connector is higher than the first current, the second circuit powers up.

BRIEF DESCRIPTION OF THE APPENDED DRAWINGS

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Figure 1:
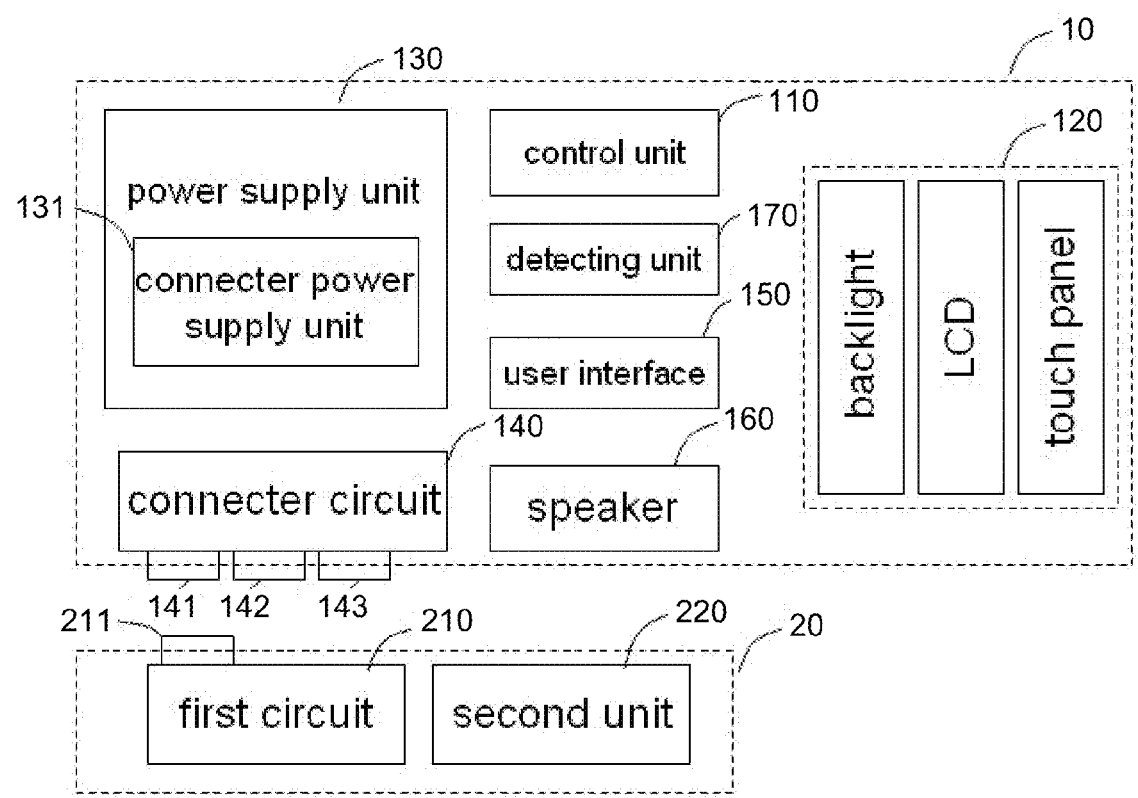
FIG. 1 is a functional block diagram illustrating the electronic device and the external electronic device.

Referring to FIG. 1, one of connectors 141, 142 and 143 of an electronic device 10 connects to a connector 211 of an external electronic device 20. The electronic device 10 comprises a control unit 110, LCD touch panel 120, system power supply unit 130, connector circuit 140, user interface 150, speaker 160 and a detecting unit 170. Connector circuit 140 has first connector 141, second connector 142 and third connector 143. The electronic device 10 can be a personal computer system, a laptop computer or a tablet computer which has two or more connecters. The external electronic device 20 has at least one connector 211 selectively connecting one of connectors 141, 142 and 143. The connected connectors can exchange data between electronic device 10 and external electronic device 20. Also, the electronic device 10 can provide rated voltage and current to external electronic device 20. The external electronic device 20 can be a keyboard, a mobile phone, a rechargeable battery or an external monitor. Connectors 141, 142, 143 and 211 can be MHL, USB, RS-232 or HDMI interface for providing rated voltage and current.

Figures 2, 3A, 3B:
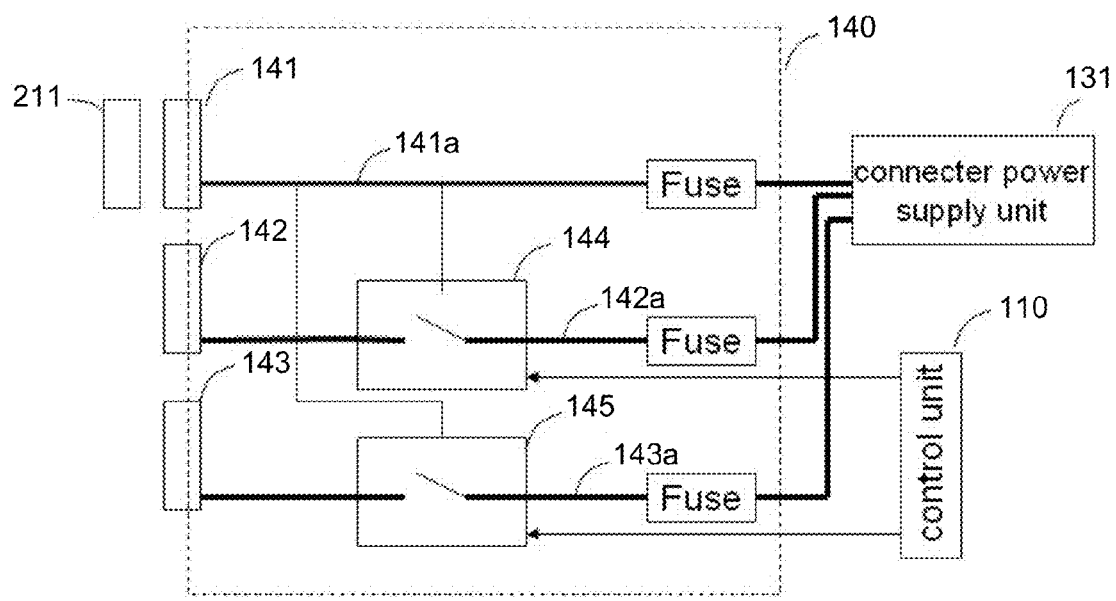
FIG. 2 is a functional block diagram illustrating the interface circuit.
FIGS. 3a and 3b are the power information showed on the display.

FIG. 2 shows the internal circuit of connector circuit 140 connecting to control unit 110. Connector power supply unit 131 provides a first current, a second current and a third current through path 141a, 142a and 143a to the first connector 141, the second connector 142 and the third connector 143 respectively. Each of the paths is set a fuse on. When the connector 211 connects the first connector 141, if the user knows the current needed for the external electronic device 20 is higher than the first current. The user can operate the electronic device 10 from the user interface 150 to increase the current in the first path 141a. The control unit controls the first switch unit 144 to guide the second current from the second path 142a to the first path 141a and flows to the first connector 141. Then, the electronic device 10 can provide higher current than the first current to external electronic device 20. As the extra current providing to the first connector 141 is from the second path 142a, the second connector 142 stops providing any current. In FIG. 3b, the power information of the second connector 142 will show "Not Available".

FIGS. 3a and 3b shows the power information of the electronic device 10 displaying on the LCD touch panel 120. User can find the most updated power information and adjust the current supply to the connectors accordingly. For example, the system power supply unit 130 provides power to the elements of the electronic device 10, including the connectors. The system power supply unit 130 evaluates the current status of each connector, the total power of the system and the total power of the connectors. The LCD touch panel 120 displays the quantities of current providing to connectors, the total power of the system and the total power of the connectors. FIGS. 3a and 3b show tables of the power information, the power upper limits are also marked on the tables for reminding the user not to make the electronic device 10 exceeding the upper limits of the electronic device 10. The electronic device 10 has some power consuming units can be operating in a high power or a low power normally. The power consuming units may be speaker 160, backlight or touch panel. When the total power of the system is higher than a preset threshold, 65.00 Watt, the control unit 110 will select some of the above mentioned power consuming units to lower down their power supply. Then, the total power of the system is lower down and displaying a warning message on the LCD touch panel 120. When the user knows the current needed for the external electronic device 20 is higher than the first current plus the second current. The user can operate the electronic device 10 from the user interface 150 to increase the current in the first path 141a. The control unit controls the second switch unit 145 to guide the second current from the second path 143a to the first path 141a and flows to the first connector 141. Then, the electronic device 10 can provide higher current than the first current plus the second current to external electronic device 20. When the total power of the connectors is higher than the upper limit, 7.5 Watt, displaying a warning message on the LCD touch panel 120.

In this invention, the external electronic device 20 has a first circuit 210 and a second circuit 220. The first circuit 210 stores a power parameter for indicating the proper current that the external electronic device 20 needed. Normally the first current is enough to power the first circuit 210. If the first current is enough to power both the first circuit 210 and the second circuit 220, the power parameter will be a first value. If the first current is not enough to power the second circuit 220, the power parameter will be a second value. When the connector 211 connects the connector 141, the first current makes the first circuit 210 powers up. The detecting unit 170 detects the power parameter stored in the first circuit 210. If the power parameter is higher than a preset threshold, the control unit 110 makes the first switch unit or the second switch unit 145 guiding the second current or the third current to the connector 141. By the above procedures, the current can be automatic adjusted. Another embodiment, the external electronic device 20 can be a media player with a battery. The media player has a having a media play circuit, the first circuit 210, and a charger, the second circuit 220. When the media player is used independently, the battery provides power to the media play circuit for playing multimedia. The media play circuit needs less current than the charger. When the media player connects the connector 141 of the electronic device and the media play is not in a battery charging mode, the media play circuit can be operated with the first current and the charger is not powered up. When the media player comes into the battery charging mode, the charger needs a higher power. Then the switch unit 144 or 145 guides the second current or the third current to the first connector 141. When the larger current comes into the media player, the charger is powered up. The media play circuit stores a power parameter, when the media player connects the electronic device, the current of the connector adjusted accordingly.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An electronic device connecting to an external electronic device, the external electronic device comprising a connector, the electronic device comprising:

a first connector;

a second connector;

a power supply unit for providing a first current to the first connector and a second current to the second connector;

a first switch unit coupling the first connector and the second connector; and a control unit for controlling the first switch unit, wherein when the first connector connects the connector of the external electronic device, the first switch unit selectively switches the second current providing to the first connector;

the electronic device further comprising:

a third connector, the power supply unit providing a third current to the third connector; and a second switch unit coupling the first connector and the third connector, wherein the second switch unit is configured to selectively switch the third current providing to the first connector or the third connector.

2. The electronic device according to claim 1, wherein when the second current provides to the first connector, the second connector stops providing current.

3. The electronic device according to claim 1, the electronic device further comprising:

an input interface for controlling the control unit to control the first switch unit.

4. The electronic device according to claim 1, the electronic device further comprising:

a power consuming unit for selectively operating with a first power and a second power, wherein when a total current of the power supply unit higher than a first threshold, the power consuming unit operating from the first power to the second power, the first power is higher than the second power.

5. The electronic device according to claim 4, wherein when the total current
lower than a first threshold, the power consuming unit operating in the first power.

6. The electronic device according to claim 4, the electronic device further comprising:

a display unit for display quantities of current providing to the first connector and the second connector and the total current.

7. The electronic device according to claim 6, wherein the display displays a warning message when the power consuming unit operates in the second power.

8. The electronic device according to claim 1, wherein when the first connector connects the connector of the external electronic device, the second switch unit selectively switches the third current providing to the first connector.

9. The electronic device according to claim 1, wherein the first connector and the second connector provide same rated voltage.

10. The electronic device according to claim 1, the electronic device further comprising:

a detecting unit for detecting a power parameter of the external electronic device, wherein when the power parameter higher than a second threshold, the first switch unit selectively switches the second current providing to the first connector.

11. The electronic device according to claim 1, the external electronic device storing a power parameter, wherein when the first connector connects the connector of the external electronic device, the control unit reads the power parameter through the connector and determines switching the second current providing to the first connector.

12. The electronic device according to claim 11, the external electronic device comprising a first circuit and a second circuit, the first circuit storing the power parameter, wherein when the connector connects to the first connector and the first circuit operated by the first current, the control unit reads the power parameter and determines providing the second current to the first connector, the second circuit turns on.

13. An electronic device connecting to an external electronic device, the external electronic device comprising a connector, a first circuit and a second circuit, the first circuit storing a power parameter, the electronic device comprising:

a first connector;

a second connector;

a power supply unit for providing a first current to the first connector and a second current to the second connector; and a first switch unit coupling the first connector and the second connector; and a control unit, wherein when the first connector connects the connector of the external electronic device, the connector providing the first current to the first circuit through the first connector, the control unit reads the power parameter and determines switching the second current providing to the first connector according to the power parameter;

the electronic device further comprising:

a third connector, the power supply unit providing a third current to the third connector; and a second switch unit coupling the first connector and the third connector, wherein the second switch unit is configured to selectively switch the third current providing to the first connector or the third connector.

14. The electronic device according to claim 13, wherein when the first switch unit providing the second current to the first connector, the second circuit turns on.

* * * * *